March 17, 1970  J. M. STANLEY  3,500,513
ISODYNAMIC APPARATUS FOR MOLDING CERAMIC PIPE
Filed May 4, 1967  2 Sheets-Sheet 1

Inventor:
John M. Stanley
By: Walter L. Schlegel, Jr.
Spencer L. Blaylock
Attys.

March 17, 1970  J. M. STANLEY  3,500,513
ISODYNAMIC APPARATUS FOR MOLDING CERAMIC PIPE
Filed May 4, 1967  2 Sheets-Sheet 2

Inventor:
John M. Stanley
By Walter L. Schlegel, Jr.
Spencer L. Blaylock
Attys.

United States Patent Office 3,500,513
Patented Mar. 17, 1970

1

3,500,513
ISODYNAMIC APPARATUS FOR MOLDING
CERAMIC PIPE
John M. Stanley, Milledgeville, Ga., assignor to Amsted
Industries Incorporated, Chicago, Ill., a corporation of
New Jersey
Filed May 4, 1967, Ser. No. 636,098
Int. Cl. B28b 7/06, 21/18
U.S. Cl. 25—30                                        1 Claim

ABSTRACT OF THE DISCLOSURE

This invention relates to an apparatus for the iso-dynamic pressing of ceramic particles. A mold is provided, the outer surface of the mold cavity being formed by an elastomeric material, which material is retained in a rigid member. Pressure is applied to one end of the elastomeric material thereby applying pressure inwardly to compact the particles around the inner mold member.

In the conventional method of making vitrified clay pipe, the clay is ground to a suitable particle size, then water is added until the water content is approximately 20% by weight. Thereafter, the clay is extruded and the pipe must be dried in order to remove the excess water from the clay before the pipe can be fired for the purpose of vitrifying it, since otherwise the water would form steam and destroy the pipe. It has been proposed in Patent No. 3,239,591 to eliminate this drying process by the compacting of the clay particles by the use of an elastomeric cylinder and oil pressure to force the elastomer inwardly to compact the clay particles around a mandrel. Certain drawbacks have been found to exist in such process in that the container for the oil may rupture, due to the pressure involved, and spray the entire area with the oil. In addition, if the elastomer cracks the oil will be forced into the cavity destroying the clay pipe therein, thereby increasing the cost of the operation.

It is, therefore, an object of the present invention to provide an apparatus for producing ceramic articles which do not have the disadvantages of the prior art.

Another object of this invention is to provide an apparatus for the iso-dynamic pressing of clay pipe without the use of oil.

A further object of this invention is to provide an apparatus for making vitrified clay pipe utilizing simple apparatus to accomplish the pressing of the dry clay particles into the form of a branched pipe or pipe fitting.

Another object of this invention is to provide a vitrified clay pipe manufacturing apparatus in which by a simple mold change, various forms of clay pipe or clay pipe fittings may be produced by the same piece of equipment.

These and other objects and advantages of this invention will become apparent from a reading of the following detailed description of this invention when taken in conjunction with the drawings wherein this invention is being described with particular reference to the manufacture of clay pipe and fittings. It should be understood that other ceramic articles may be produced by this invention.

2

Figure 2:
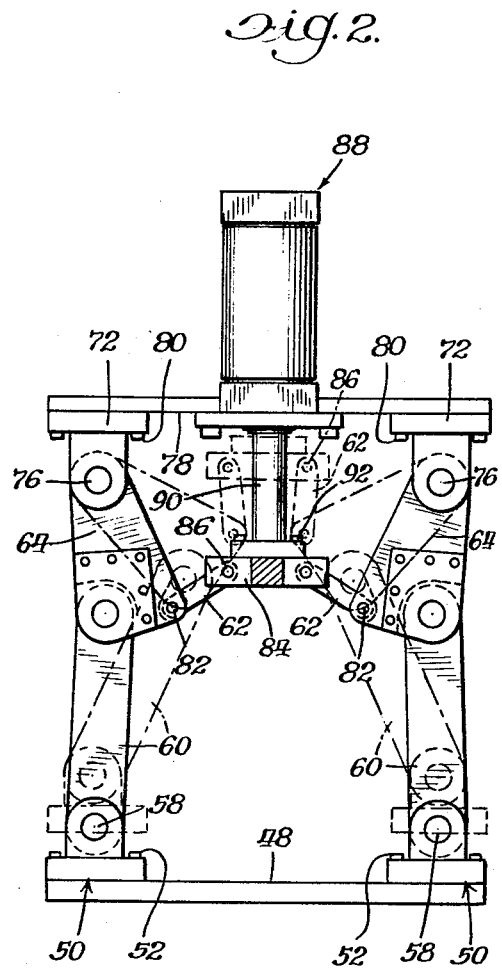
FIGURE 2 is an elevational view of the toggle mechanism of the apparatus of this invention with parts of the overall apparatus removed and a portion in cross-section.

Referring now to the drawings, reference numeral 10 denotes the main base for the apparatus for this invention, which base will rest on a suitable support (not shown) to permit removal of the finished article from the apparatus. Four upstanding tie rods 12 are provided which are threaded into openings 14 at the four corners of the base 10. Jam nuts 16 are provided to retain the four tie rods 12 in the desired position on the base 10. Only two tie rods have been shown in FIGURE 1. It should be understood that the other two, which are not shown, are located at the opposite corners of the base 10.

Resting on and supported by the base 10, is a pressure vessel 18 having sufficient wall thickness to withstand the pressures to which it will be subjected during the operation of this apparatus. The vessel 18 is provided with a cylindrical wall 19 and a base 21. In the preferred embodiment, a piston will be substituted for the base 21 in order that pressure may be exerted in both directions and also to permit bottom withdrawal of the finished article from the vessel 18. See FIGURE 3 for such a substitution. A spring (not shown) could be placed between the vessel 18 and the lower piston. Positioned within the interior cavity 20 of the vessel 18 is a cylindrical elastomeric casting 22 which is provided with an inner surface 24. The surface 24 of the elastomeric casting 22 is of the same configuration as the exterior surface of the clay pipe or pipe fitting which is to be produced in the vessel 18.

Centrally positioned within the pressure vessel 18 and the casting 22 is a mandrel 26 which mandrel has an external configuration of the internal configuration of the clay pipe article that is to be produced. The outer surface of the mandrel 26 is spaced from the inner surface 24 of the casting 22 providing therebetween a molding cavity 28 into which the clay particles 30 are flowed by suitable apparatus (not shown).

The upper portion 32 of the pressure vessel 18 is open to provide an opening 34. The opening 34 is adapted to receive a ram 36, the function of which will be explained hereinafter.

A platen 38 is slidably mounted on the four tie rods 12 by bushings 40 which permit sliding movement of the platen 38 on the tie rods 12. The ram 36 is secured to the underside 42 of the platen 38.

Between each pair of tie rods 12 is positioned a toggle linkage 44 the lower end 46 of which is secured to the upper surface 48 of the platen by the links 50. The links 50 are secured by suitable means such as bolts 52 to the upper surface 48 of the platen 38. The links 50 comprise a support plate 54 which is secured by the bolts 52 to the platen. Upstanding from the supports 54 are a pair of bosses 56 which are provided with a central opening to receive therein a link pin 58 to permit movement of the toggle linkage 44 when desired.

The toggle linkage 44 consists of three links 60, 62 and 64, whose configurations are shown in FIGURE 2. The exact configuration of the links 60, 62 and 64 is not particularly critical to the successful operation of this invention, it being merely necessary that the links be capable of movement as will be hereinafter explained. The link 60 is secured at its lower end 46 to the bosses 56 of the toggle support 50 by the pin 58. Its upper end 66 is secured to link 64 by pin 68 in such fashion that it is movable with respect to the support 50 and the link 64. The link 64 is secured at its upper end 70 to upper link support 72 by bosses 74 and pin 76. The upper link support 72 is rigidly secured to the cylinder support 78 as by bolts 80.

The link 62 is movably connected to link 64 by pin 82 and at its other end to linking member 84 by pin 86. Each link 62 is joined to linking member 84 at a corner of the linking member. The function of the linking member 24 will be explained hereinafter. Supported on cylinder support 78 is a hydraulic cylinder 88 whose piston rod 90 is secured at one end thereof to the linking member 84 as by screws 92.

The location of cylinder support 78 on the four tie rods 72 may be changed by adjusting the lower jam nuts 94 and the upper jam nuts 96. The position of the cylinder support and its associated structure is changed with a change in the pressure vessel 18 when changing the machine from one to manufacture clay pipe to one to manufacture clay pipe fittings. If desired, the toggle linkage 44 may be eliminated and a direct acting pressure cylinder utilized in place of the linkages 44.

In operation, the cylinder 88 will retract the piston rod 90 thereby moving the linking member 84 upwardly to its dotted line position as shown in FIGURE 2. The associated toggle links will move to their positions, also indicated in dotted lines in FIGURE 2. Upward movement of linking member 84 and the toggle linkages 44 causes the platen 38 to move upwardly with the parts in the dotted line position as shown in FIGURE 2. This raises the pressure ram 36 upwardly and out of the opening 34 in the top 32 of the pressure vessel 18.

Clay of the desired particle size may be introduced into the cavity 28 by suitable conventional feeding mechanisms (not shown). After the clay particles have filled the cavity 28, the hydraulic cylinder 88 is actuated to move the ram 36 into the opening 34 and to close the opening.

Figure 1:
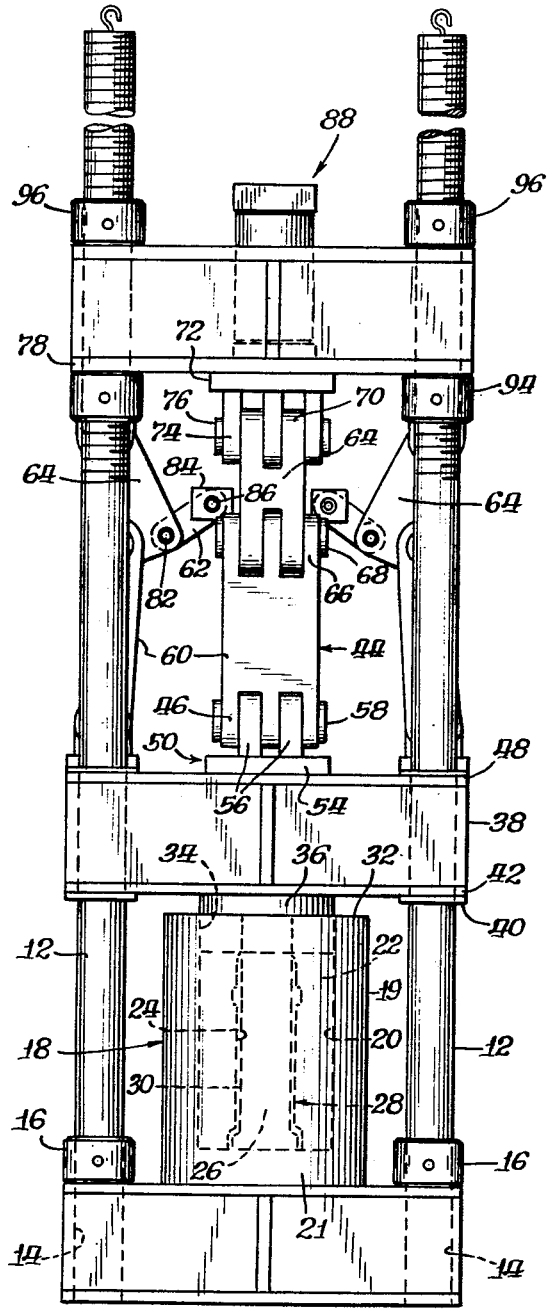
FIGURE 1 is an elevational view of the apparatus of this invention.
Figure 3:
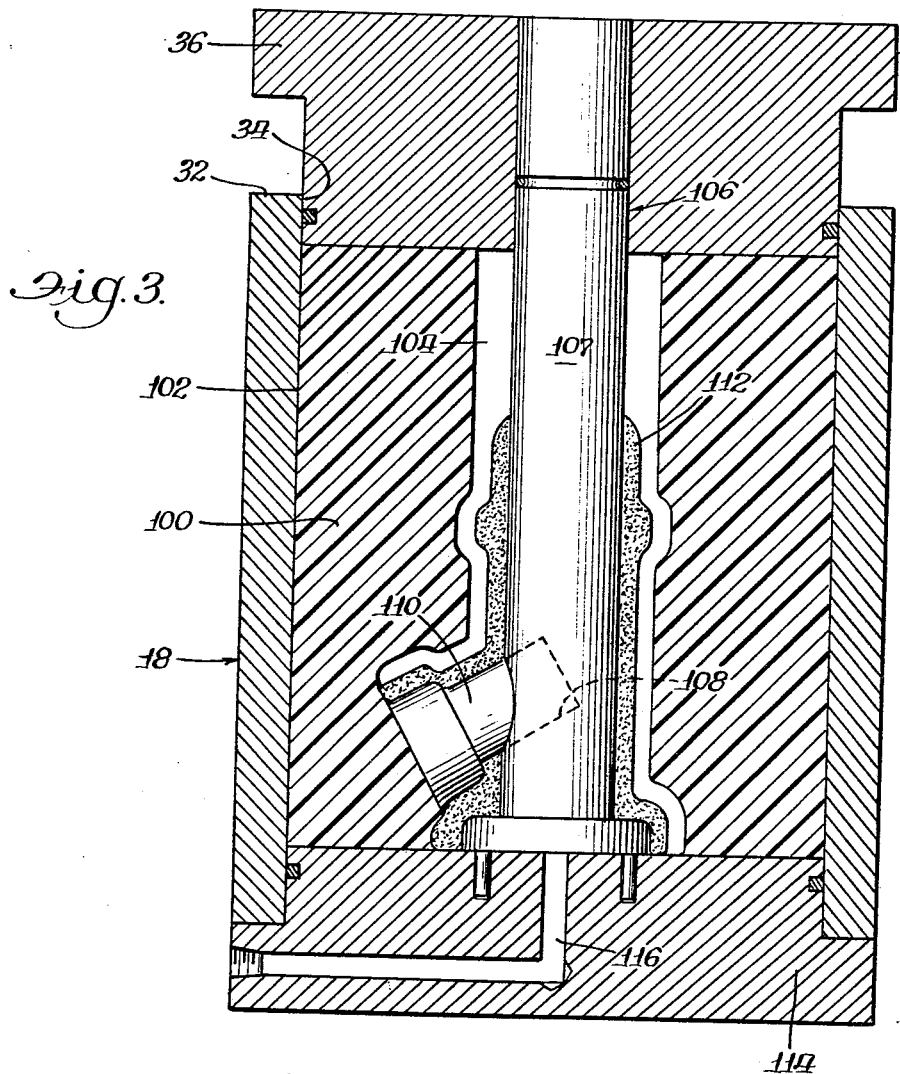
FIGURE 3 is a cross-sectional view of a preferred mold apparatus according to this invention.
Figure 4:
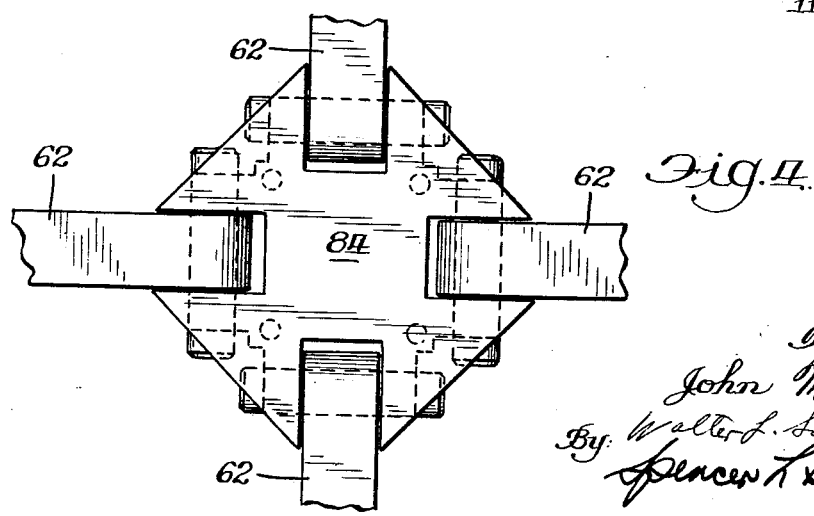
FIGURE 4 is a bottom plan view of a portion of the toggle mechanism of FIGURE 2.

As soon as the cavity 28 is closed a vacuum is pulled on the clay in the cavity 28 to remove as much air as possible. The vacuum equipment is not shown in FIGURE 2, however, the vacuum line relationship to the cavity is shown in FIGURE 3 and will be described hereinafter. The vacuum may be pulled on the cavity 28 during the filling operation if desired, also, the mandrel 26 may be vibrated to insure that the cavity 28 is filled in a minimum amount of time. After substantially all of the air has been removed from the cavity 28, the hydraulic cylinder is further actuated to move the rod 90 downwardly. Downward movement of the rod 90 moves the linking member 84 into its full line position as shown in FIGURES 1 and 2. This returns the toggle linkages 44 to their full line positions as shown in FIGURE 2. This forces the platen 38 and associated ram 36 downwardly to within a short distance of the open end 32 of the pressure vessel 18. The ram 36 presses against the elastomeric casting 22 and since it can only be moved in one direction, the surface 24 is squeezed inwardly to compact the clay in the cavity 28 to form the clay pipe 30.

The elastomeric casting being surrounded by the walls 19 of the pressure vessel 18 prevents the elastomeric casting from being squeezed outwardly and since pressure is being applied from the top of the casting and the bottom 21 of the vessel 18 is closed, it squeezes inwardly in a uniform manner to compact the clay particles in the cavity 28 to the desired pipe or fitting configuration. The downward force generated by the piston rod 90 of the hydraulic cylinder 88 is multiplied by the unique toggle linkages 44 of this invention.

After the pipe has been formed into a self-sustaining body, the hydraulic cylinder is reversed to remove the ram 36 out of the opening 34. Conventional means may be used then to remove the formed pipe from the cavity because the elastomeric casting 22 has returned to its original size leaving a space between the formed pipe and the inner surface 24 of the casting 22 as is shown in FIGURE 3.

Referring now to FIGURE 3, like reference numerals are used to denote like parts as shown in FIGURES 1 and 2. The pressure vessel 18 is cylindrical as shown in FIGURE 1 and it is provided with an inner cavity 20 to receive therein an elastomeric casting 100 which is formed of two halves only one of which is shown in FIGURE 3, the other is identical in all respects to the half shown in FIGURE 3. The casting 100, as with the casting 22 shown in FIGURE 1, is formed from a suitable elastomeric material such as polyvinyl chloride, polyurethane, rubber, neoprene or other similar elastromeric materials. The outer surface 102 of the casting 100 is cylindrical and fits tightly within the opening 34 on the pressure vessel 18. A cavity 104 is provided internally of the casting and located centrally thereof. The cavity 104 is of the contour of one half of the pipe fitting which is to be produced by the apparatus shown in FIGURE 3, the other half being formed by the other half of the casting 100. Centrally positioned within the cavity 104 is a mandrel 106, the exterior surface 107 of which is of the configuration of the interior of the pipe fitting main body. An opening 108 is provided on one side of the mandrel 106 to receive therein the spur mandrel 110, which spur mandrel 110 forms the inner surface of the spur of the clay pipe fitting 112. If a double Y or T is desired, a second spur mandrel will be inserted 180° apart from the spur 110.

The mandrel 106 and the two halves of the casting 100 rest on the piston 114 forming the bottom of the pressure vessel 18. This piston, in turn, will rest on a suitable hydraulic cylinder (not shown) to raise the same to the position shown. A vacuum passage 116 is provided within the piston 114 to permit the pulling of the vacuum on the cavity 104 when the apparatus is assembled. If desired, a second vacuum line (not shown) may be utilized at the top of the vessel 18.

The operation of this apparatus is the same as that of the apparatus as shown in FIGURES 1 and 2 in that the ram 36 presses downwardly against the casting 100 causing the same to flow inwardly and squeeze the clay in the cavity 104 into the configuration of the clay pipe fitting 112, except that the piston 114 has replaced the base 21. After the fitting 112 has been formed, the ram 36 is raised by the apparatus as shown in FIGURES 1 and 2. The piston 114, with the two mandrels 106 and 110 and the two halves of the casting 100 resting thereon, is removed from the vessel 18, and disassembled by first removing the two halves 100 and then the spur mandrel 110 and lastly the main body mandrel 106. The clay pipe fitting 112 may then be trimmed and placed on a suitable kiln car for conventional firing.

It can be seen from the foregoing that clay pipe and clay pipe fittings may be produced by the apparatus of this invention without the necessity of the use of wet clay, thereby eliminating the drying step. It can also be seen that both clay pipe and pipe fittings may be produced by this apparatus merely by the changing of the elastomeric castings and the mandrels.

I claim:
1. An apparatus for the manufacture of a branched clay pipe comprising an upright mandrel having an outer surface conforming to the inner surface of the pipe to be formed and having a side opening socket, an elastomeric sleeve formed in two complementary halves encircling said mandrel and having a bore conforming to the outer surface of said pipe and defining a generally annular cavity surrounding the mandrel, said bore including a lateral enlargement providing a supporting surface facing said socket, a spur mandrel having one end seated on said supporting surface and its other end removably disposed in the socket, a pressure vessel containing the sleeve, a bottom closure for the vessel supporting the upright mandrel and the sleeve, a ram closing the upper end of the vessel having a central bore receiving the upright mandrel and a bottom surface bearing on the sleeve, and means operating the ram for applying pressure to the sleeve for contracting the sleeve about clay particles in the cavity around the mandrels, said pressure vessel being segmental to accommodate its disassembly and subsequent separation of the mandrels from each other and withdrawal from the pipe.

References Cited

UNITED STATES PATENTS

| | | | |
|---|---|---|---|
| 2,172,243 | 9/1939 | Goodnow et al. | 264—313 |
| 2,558,823 | 7/1951 | Crowley et al. | 264—313 X |
| 2,573,141 | 10/1951 | Heinrich | 264—102 |
| 2,681,494 | 6/1954 | Weber | 25—127 X |
| 2,777,185 | 1/1957 | Wehrung | 249—145 |
| 3,061,873 | 11/1962 | Supitilov et al. | |

ROBERT F. WHITE, Primary Examiner

J. H. SILBAUGH, Assistant Examiner

U.S. Cl. X.R.

25—127; 264—102, 313